US005692339A

United States Patent [19]
Conley et al.

[11] Patent Number: 5,692,339
[45] Date of Patent: *Dec. 2, 1997

[54] METHOD FOR PRODUCING RAISINS

[75] Inventors: Bruce G. Conley, Reedley; David L. Walker, Caruthers, both of Calif.

[73] Assignee: Sun-Maid Growers of California, Kingsburg, Calif.

[*] Notice: The term of this patent shall not extend beyond the expiration date of Pat. No. 5,411,561.

[21] Appl. No.: 657,240

[22] Filed: Jun. 3, 1996

Related U.S. Application Data

[63] Continuation of Ser. No. 427,053, Apr. 24, 1995, abandoned, which is a continuation-in-part of Ser. No. 85,668, Jun. 30, 1993, Pat. No. 5,411,561, which is a continuation of Ser. No. 814,140, Dec. 30, 1991, abandoned.

[51] Int. Cl.$^6$ .......................... A01G 17/00; A01G 17/06
[52] U.S. Cl. ................................................ 47/58; 47/44
[58] Field of Search ........................ 47/58, 44; Plt./47.3

[56] References Cited

U.S. PATENT DOCUMENTS

| P.P. 2,961 | 1/1970 | Gebnart | Plt./47.3 |
|---|---|---|---|
| P.P. 4,784 | 11/1981 | Olno et al. | Plt./47.3 |
| P.P. 5,856 | 1/1987 | Garabedian | Plt./47.3 |
| 5,144,768 | 9/1992 | Hiyama et al. | 47/46 |
| 5,411,561 | 5/1995 | Conley | 47/58 |

OTHER PUBLICATIONS

P. Christensen et al., "Mechanical Harvesting of Black Corinth Raisins," *California Agriculture*, pp. 4–6 (Oct. 1970).

P. May et al., "Mechanizing the Production of Sultana (Thompson Seedless) Raisins," Univ. of California, Davis Grape and Wine Centennial Symposium Proceedings, 1880–1980, pp. 191–194 (1980).

I. Gould et al., "Mechanization of Raisin Production with the Irymple Trellis System," *Transactions of the ASAE*, Jan.–Feb. 1987, pp. 56–60.

J. Weinberger et al., "'Fiesta' Grape," *Hort. Science*, vol. 9(6) (Dec. 1974).

R. Hayes et al., "The Shaw Trellis—A New Innovation in Trellis Dried Sultana Production," *Department of Agriculture Technical Report Series No.* 193, Dept. of Agriculture, Victoria, Australia. pp. 5–8, undated.

H. Studer, "Vine Drying of Raisin Grapes," *Department of Agriculture Engineering*, UCD, 4 pages (1988).

H. Studer et al., "Vine Drying of Thompson Seedless Grapes," *Transactions of the ASAE*, pp. 944–947 (1973).

H. Studer, "Vine Drying of Raisin Grapes in Coachella Valley," *California Grape Grower*, pp. 16, 19–20 (Mar. 1988).

*Primary Examiner*—Douglas W. Robinson
*Assistant Examiner*—Melissa L. Kimball
*Attorney, Agent, or Firm*—Townsend and Townsend and Crew LLP

[57] ABSTRACT

A method for producing natural, sun-dried raisins from the Thompson seedless grape variety in vineyards located in the Central Valley of California, or similarly situated vineyards, having about 4000 to 5100 degree days during the growing and drying season and an annual yearly rainfall of between about 10 to 12 inches. Rows (2) of grape vines (4) are grown at the vineyard site. The canes are trained so to create divided canopies along the rows of grape vines. The divided canopy has fruiting canes (26) primarily on one side of the row and replacement canes (28) separated from the fruiting canes, typically on the other side of the row. Once the grapes are sufficiently mature, the fruiting canes are cut (34) adjacent the crowns (32) of the grape vines. The grapes (30), still hanging from the cut fruiting canes, are left to dry naturally in the sun to create natural raisins. When sufficiently dry, the raisins are harvested directly from the cut canes. This method eliminates the need for drying grapes on drying trays or rolls of paper on the ground when producing natural, sun-dried grapes.

7 Claims, 6 Drawing Sheets

METHOD FOR PRODUCING RAISINS

This is a continuation patent application of U.S. patent application Ser. No. 08/427,053 filed April 24, 1995, now abandoned which is a continuation-in-part patent application of U.S. patent application Ser. No. 08/085,668 filed Jun. 30, 1993, now U.S. Pat. No. 5,411,561, which is a FWC continuation application of U.S. patent application Ser No. 07/814,140 filed Dec. 30, 1991, now abandoned, the disclosures of each being incorporated by reference.

BACKGROUND OF THE INVENTION

California is the leading producer of raisins in the United States. About 97% of all California raisins are from the variety Thompson seedless, also called Sultana in Australia and Europe. There are three main methods by which raisins are produced in California. One method is to dip the grapes into a caustic soda and water solution followed by exposure to sulphur/$CO_2$ and then dried in a dehydrator to create golden colored raisins. These raisins have a certain following and are distinguished by their golden color and their slightly sulfur taste. A second type of raisin made in California is by a hot water dipped process. In this process, green grapes are dipped in a hot water solution which not only slightly splits the skins to promote subsequent drying but also causes the resulting raisin to have a darkish (brown) color and a taste vaguely reminiscent of chocolate.

By far the most prevalent type of raisins sold in the United States is the natural Thompson seedless (NTS) raisin. NTS raisins are dried in the sun. In this sun drying process, green grapes are picked when sufficiently ripe, typically about 21° Brix, and placed on drying trays or strips of paper. The drying trays or paper strips are placed on dirt mounded or terraced between the rows of vines. It usually takes about 3 weeks to sun-dry raisins in the Central Valley of California. This produces the conventional dark-colored, NTS raisin in a simple and cost-effective manner.

One of the problems with dried-on-the-ground type raisins is the chance of rain during the drying season. If rained on, dried-on-the-ground raisins are susceptible to mold, infestation, rot and may be ruined. Also, especially under more humid conditions, these raisins might be attacked by certain molds or mildew which would ruin them for human consumption. Another problem with dried-on-the-ground raisins is the cost associated with picking the grapes, placing the trays on the dirt mounds formed between the rows, and gathering the raisins when dried.

Efforts to mechanically harvest green grapes and automatically deposit them onto strips of drying paper between the rows have been made. Because of the violence with which grapes are mechanically harvested (the grapes are beaten or shaken off their vines), a certain amount of damage and stickiness to the grapes occurs. While this is not a problem if the grapes are immediately crushed, such as occurs when making wine, leaving damaged grapes on drying trays on the ground for a number of weeks may create lower quality raisins and could result in the growth of molds and mildew as well as promote insect damage.

Other parts of the world, such as Australia, do not produce substantial amounts of natural raisins. Rather, the green grapes, when mature, are sprayed with an oil emulsion, typically 2% aqueous solution of methyl oleate and potassium carbonate. This creates tiny cracks in the skin to aid drying of the raisins and produce a lighter color raisin. The sprayed grapes are generally dried in large drying racks using chicken wire.

There is an Australian system for producing dried-on-the-vine raisins using what is called an Irymple trellis system. In that system, divided canopies are created along the row of grape vines. To create divided canopies, the fruiting canes are supported on horizontal trellis systems along one side of the row while the replacement canes are supported on the other side of the row. The fruit develops from the fruiting canes and hangs freely below the leaf canopy beneath the fruiting canes. When the fruit is mature, the grape bunches are sprayed with an oil emulsion, such as methyl oleate, and the fruiting canes are cut to speed drying of the grapes. It has been found that cutting the fruiting canes at this time, so long as one limits the number of canes cut to no more than about 50% of the total canopy, does not injure the vine, which would reduce the next year's harvest.

The advantages of on-the-vine drying Thompson seedless grapes in the Central Valley area of California are compelling. However, the conventional wisdom on doing this is that it is not possible to vine dry Thompson seedless grapes in the Central Valley of California to produce raisins without the use of chemical treatment. For example, in a paper entitled "Vine-Drying of Thompson Seedless Grapes", Henry E. Studer, Harold P. Olmo, *Transactions of the ASAE*, Vol. 16, No. 5, pp. 944–952, 1973, the authors stated: "The feasibility of drying the fruit before harvest while it is hanging from the trellis wires on severed canes was casually examined in 1965 (Studer and Olmo, 1967). The conclusion was that weather conditions during the fall months in California's Central Valley are such that complete on-the-vine drying of the fruit into raisins was not practical." The conclusions of that article included the following: "The severed-cane technique permits partial drying of Thompson seedless grapes into raisins directly on the vine . . . . A final moisture content of 15% or less can be achieved by drying the fruit for approximately 12 hours in a tunnel dehydrator, or under deep bed drying conditions."

In an article entitled "Vine Drying Raisin Grapes In Coachella Valley", Henry E. Studer, *California Grape Grower*, March, 1988, pp. 16–20, the author stated "Attempts to use cane severing followed by drying on the vine to the Thompson seedless variety have been unsuccessful in the Central Valley of California." The article states that Zante currents, made from Black Corinth grapes in the Central Valley, have been successfully produced using on-the-vine drying. However, the Black Corinth grape variety has a very small berry which permits the on-the-vine drying. Some Thompson seedless vines are sprayed with an aqueous solution of methyl oleate and potassium carbonate to promote rapid drying of the fruit on the vine, the canes having been severed. This, of course, does not create natural raisins with their characteristic color and flavor. It also has the disadvantage of the cost associated with spraying and negative effects of the chemical spray on the vines. In summary, the author states that "In the San Joaquin Valley, acceptable varieties certainly do not exist, and natural drying on the vine is not presently a viable alternative to sun drying.

The consensus of opinion is that on-the-vine drying of Thompson seedless grapes in the Central Valley without the use of chemical sprays is not viable.

SUMMARY OF THE INVENTION

The present invention is directed to a method for producing natural raisins from grapes of the Thompson seedless type, including Thompson seedless and Fiesta grapes, at vineyards in the Central Valley of California or climatologically similar vineyard sites. The method is carried out by creating divided canopies along the rows of grape vines with fruiting canes primarily on one side of the row or vine and replacement canes separated from the fruiting canes, and preferably on the other side of the row or vine. Once the grapes have reached a desired level of maturity, the fruiting canes are cut and the grapes are allowed to dry naturally in the sun while hanging on the cut vines. The natural raisins are then harvested, typically using mechanical harvesters.

A key feature of the invention is the recognition that, contrary to previous research and an apparent consensus of opinion, on-the-vine drying of Thompson seedless grapes in the Central Valley of California is possible without the use of chemical sprays to aid the drying process. By flying in the face of conventional wisdom, the raisin producing method described herein was arrived at.

The present invention has the advantage of drying the grapes on the vine to create the raisins. Doing so substantially eliminates the possibility of rain damage since hanging bunches, as opposed to grapes lying on drying trays on the ground, dry out quickly after a rain. Being natural raisins, without any chemical solutions applied to the grapes, the cost associated with such chemical solutions, and the accompanying negative physiological affects on the vine, are eliminated. Also, the overall labor costs are substantially reduced with the present invention, particularly because the raisins can be mechanically harvested.

Other features and advantages of the invention will appear from this following description in which the preferred embodiments have been set forth in detail in conjunction with the accompanying drawings.

DESCRIPTION OF THE PREFERRED EMBODIMENT

Figure 1:
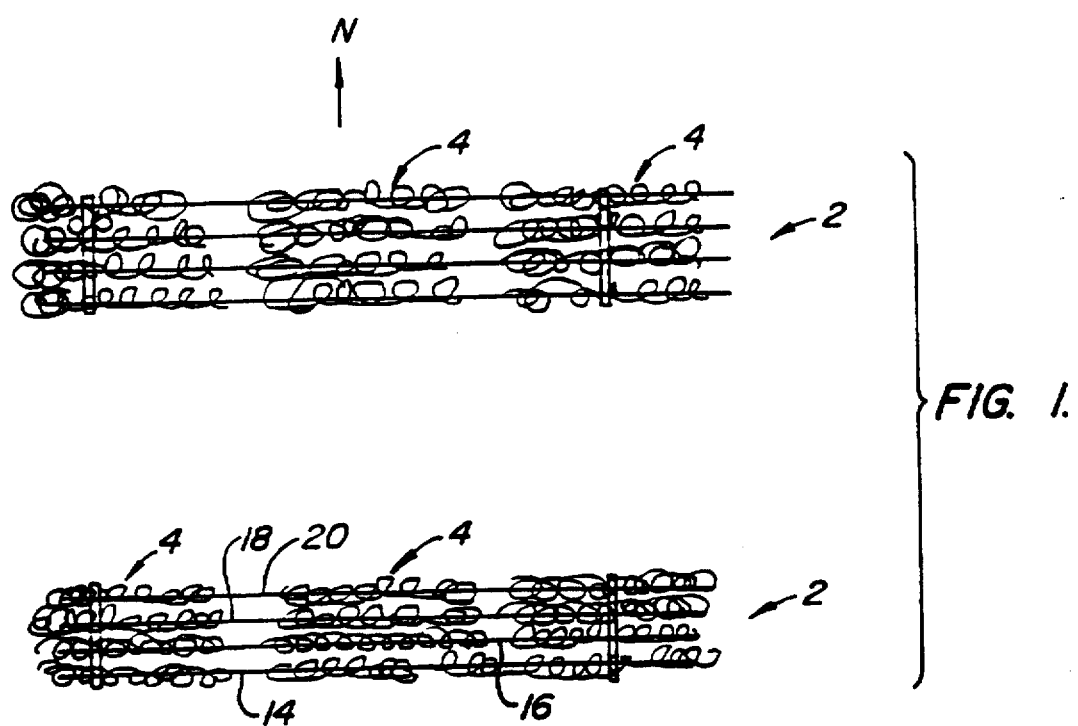
FIG. 1 is a plan view of a section of a vineyard showing two rows of east/west oriented grape vines with the vines trellised in a divided canopy arrangement.
Figure 2:
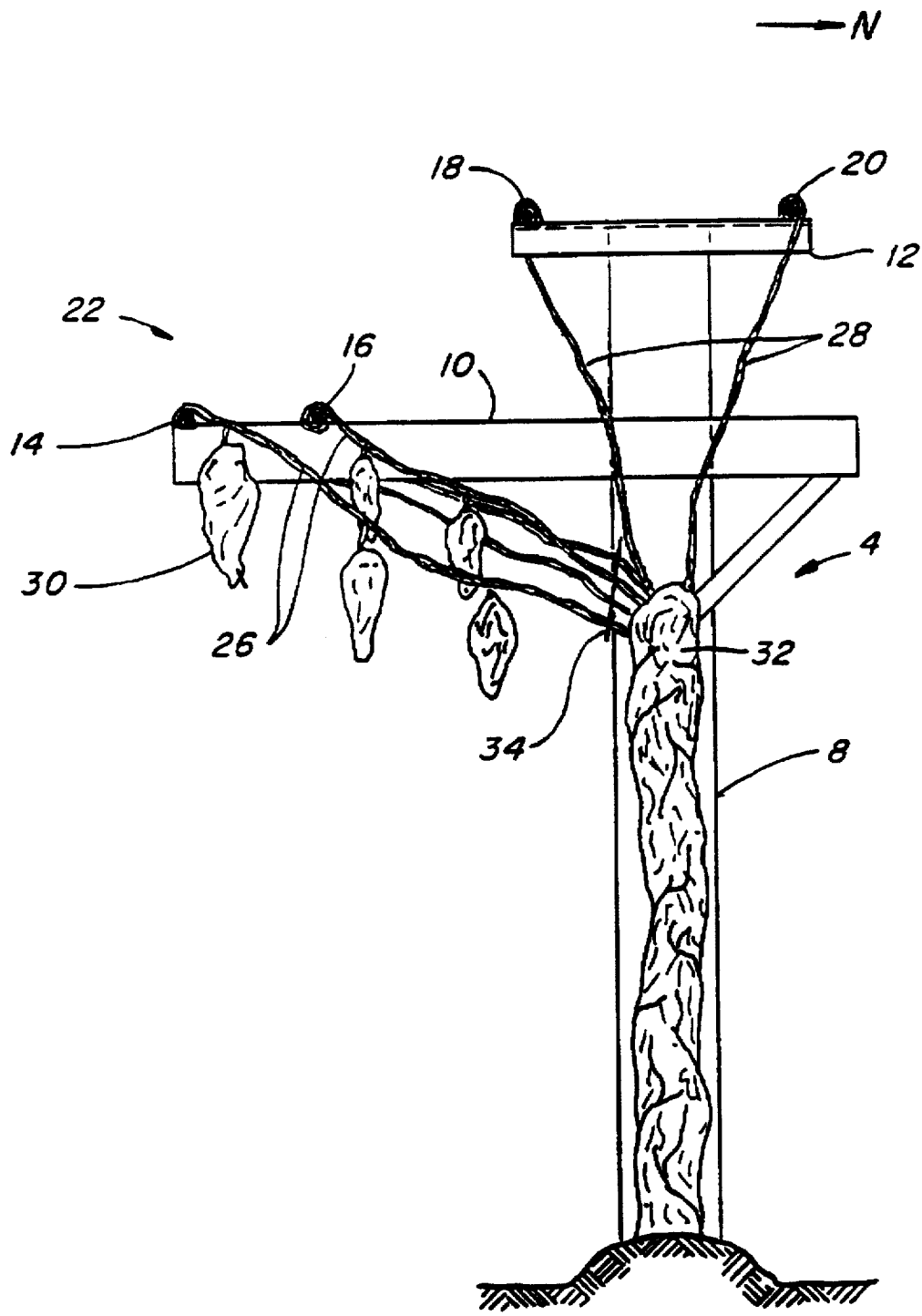
FIG. 2 is an enlarged end view taken along line 2—2 of FIG. 1 illustrating the training of the fruiting and replacement canes onto the fruiting cane and replacement cane catching trellises but with the foliage omitted for clarity.
Figure 3:
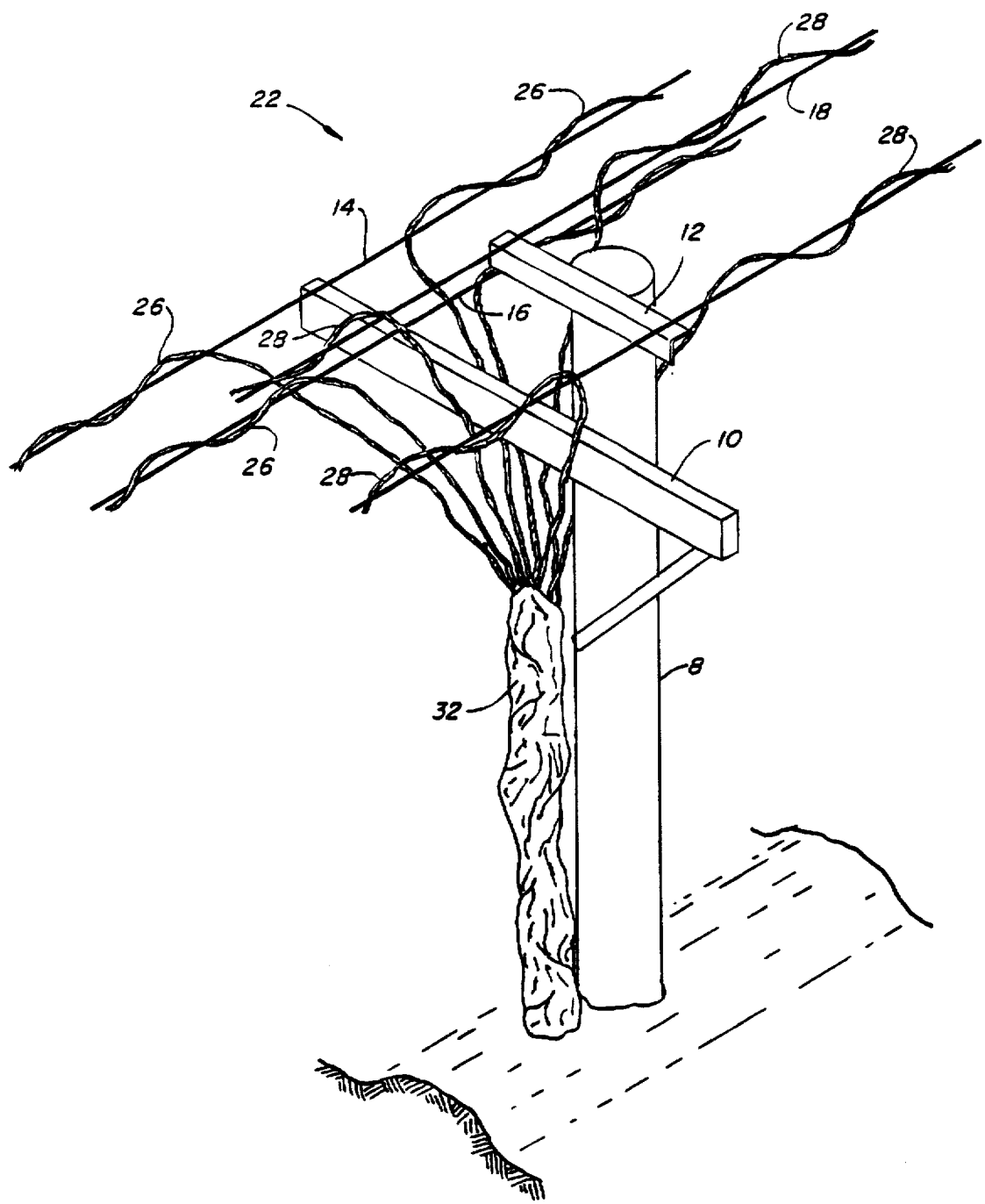
FIG. 3 is a perspective view of the grape vine, post and catching trellises of FIG. 2.

FIG. 1 illustrates rows 2 of grape vines 4. As suggested in FIG. 1, rows 2 are oriented in an east/west rows, as is conventional, with the spacing between grape vines 4 about seven or eight feet and the distance between rows 2 about 12 feet. As illustrated in FIGS. 2 and 3, trellis system 6 includes a series of common posts 8 to which an offset cross arm 10 and a centered cross arm 12 are mounted. Offset cross arm 10 supports a pair of wires 14, 16 while centered cross arm 12 supports a pair of wires 18, 20. As shown in the figures, wires 14, 16 are on one side, typically the south side, of row 2 of grape vines 4. Common post 8, cross arm 10 and wires 14, 16 constitute a fruiting cane catching trellis 22 while common post 8, cross arm 12 and wires 18, 20 constitute a replacement cane catching trellis 24. Fruiting canes 26 are trained to wires 14, 16 while replacement canes 28 are trained to wires 18, 20. Note that in FIGS. 2 and 3, the foliage is not shown for sake of clarity while the grape bunches 30 are also not shown in FIG. 3.

The procedure for growing grape vines 4 and making the resulting raisins proceeds generally as follows. After each harvest, the old fruiting canes 26 are removed and the old replacement canes 28 are trimmed and moved from trellis 24 to trellis 22 to act as the next fruiting canes. During the next spring when the new growth starts from crown 32 of grape vine 4, several replacement canes are selected from the new growth and are and guided onto wires 18, 20. The prior year's replacement canes 28 thus become the present year's fruiting canes 26 while new growth is selected as the new replacement canes 28 and trained onto wires 18, 20.

At the end of the growing season after the appropriate degree of maturity of the grapes is achieved, typically around 21° Brix for Thompson seedless grapes and about 22° Brix for Fiesta, the fruit hanging from fruiting canes 26 is substantially free from overhanging foliage of replacement canes 28. To permit the grapes to dry on the vines, fruiting canes 26 are cut adjacent crown 32 as indicated at 34. This permits foliage associated with fruiting canes 26 to dry and shrivel thus allowing more light and air to circulate among the hanging grapes. After grape bunches 30 are sufficiently dry, they are harvested by hand or, preferably, using a mechanical grape/raisin harvester.

The present invention is intended for being carried out at vineyard sites which are hot and dry but not desert. A typical vineyard site would be in the Central Valley of California. The vineyard site would be selected with the following climatological characteristics: A growing and drying season of at least 210 days long, 4000 to 5100 degree days during the growing and drying season and at least 180 sunny days during the growing and drying season. The vineyard site would preferably have a maximum chance of rain during the last 60 days of the growing and drying season of about 20% and a yearly average rainfall of between about 10 to 12 inches. Thus, desert areas, such as Dateland, Ariz., having an average annual rainfall of 3 inches and 7000 degree days, Maricopa, Ariz., having an annual rainfall of 7 inches and 6240 degree days, and the Coachella Valley of California, having similar hot and dry weather, would not be vineyard sites chosen according to the invention.

The trellising system used may be changed from that illustrated in FIGS. 2 and 3 so long as it creates a divided canopy with the fruiting canes 26 on one side of the row 2 and the replacement canes 28 separated from the fruiting canes 26.

Figure 4:
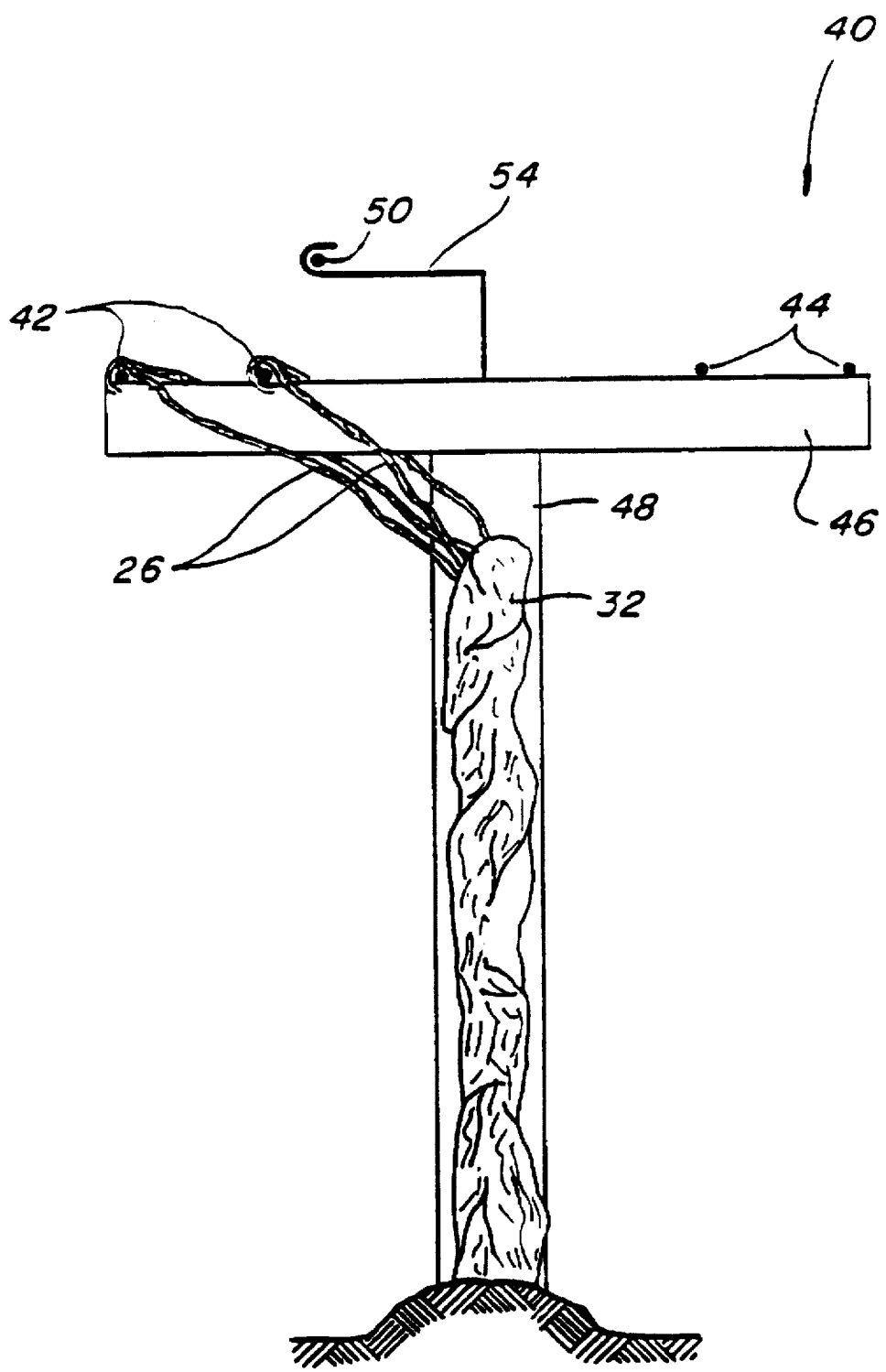
FIGS. 4 and 5 are views similar to FIGS. 2 and 3 of an alternative trellising arrangement particularly useful for rows of grape vines with north/south orientations.
Figure 5:
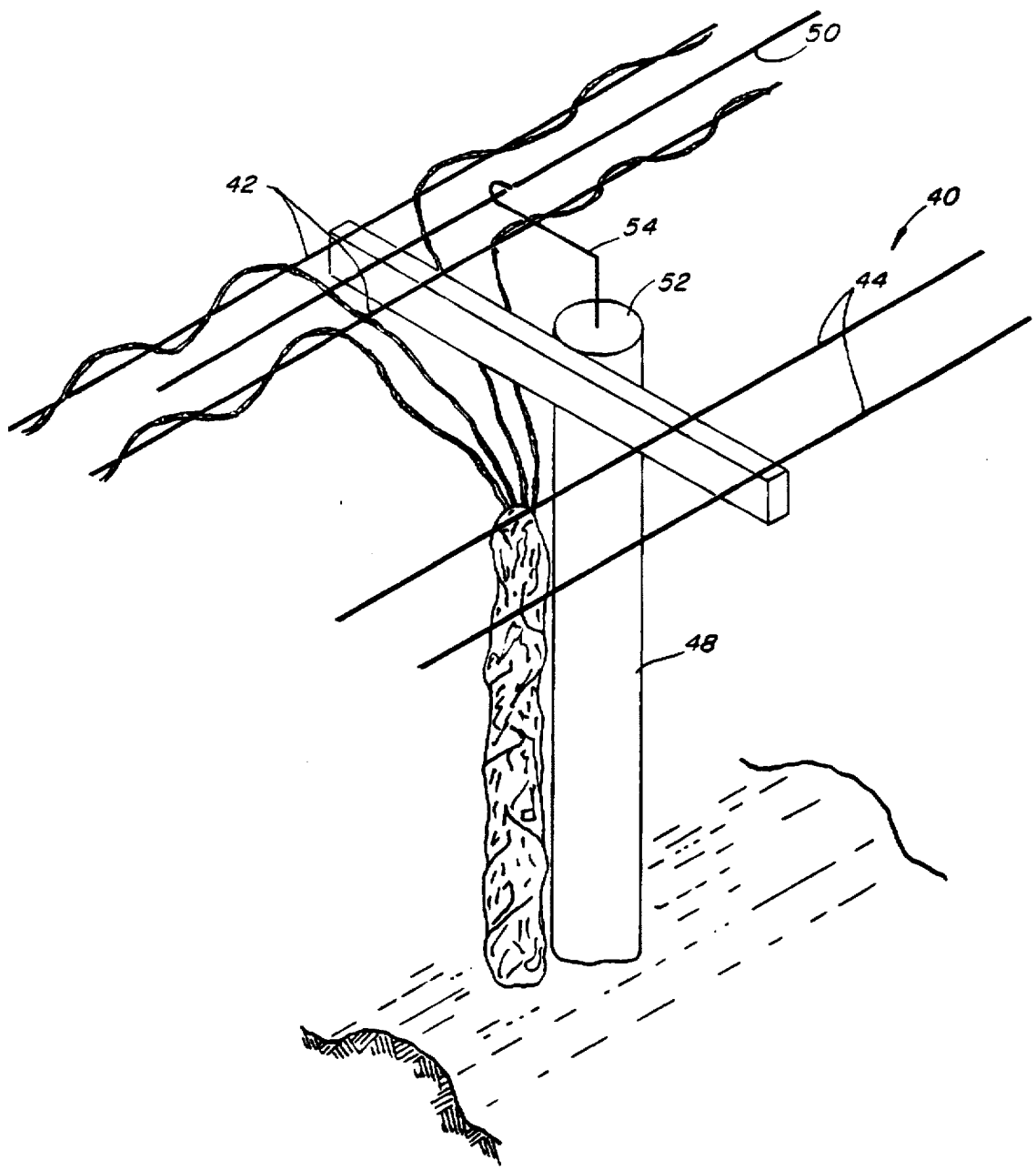

The trellising system illustrated in FIGS. 2 and 3 is particularly adapted for east/west running rows 2 of grape vines 4. FIGS. 4 and 5 illustrate a trellising system 40 specially adapted for use with north/south running rows of grape vines 4. Trellising system 40 includes two wires 42, 44 on each side of a cross arm 46, cross arm 46 being supported by a post 48. FIGS. 4 and 5 illustrate grape vine 4 with fruiting canes 26 supported by wires 42. This would be typically during the spring before the replacement canes have grown out of crown 32 of grape vine 4. The replacement canes, not shown in FIGS. 4 and 5, will be trained onto wires 44. Trellising system 40 also includes a trip wire 50 positioned about 6" above the top of post 48. Trip wire 50 does not have any vines trained to it. Rather, a few weeks prior to the grapes reaching maturity, a worker will move trip wire 50 from its position generally overlying the region above wires 42 to a corresponding region overlying wires 44. This is done by rotating a trip wire positioner 54 which extends from top 52 of post 48. Positioner 54 is pivotally mounted to post 48. Repositioning trip wire 50 helps pull any errant replacement canes 28 away from fruiting canes 26 for more efficient ripening of the grapes and subsequent drying of the raisins after fruiting canes 26 are severed from crown 32 of grape vine 4. Other trellising systems, such as the Irymple trellis used in Australia can be used. The Irymple trellis has a horizontal cross arm supporting the fruiting canes on one side of the row and an angled cross arm, extending upwardly at about a 30° angle, on the other side of the row supporting the replacement canes.

Figure 6:
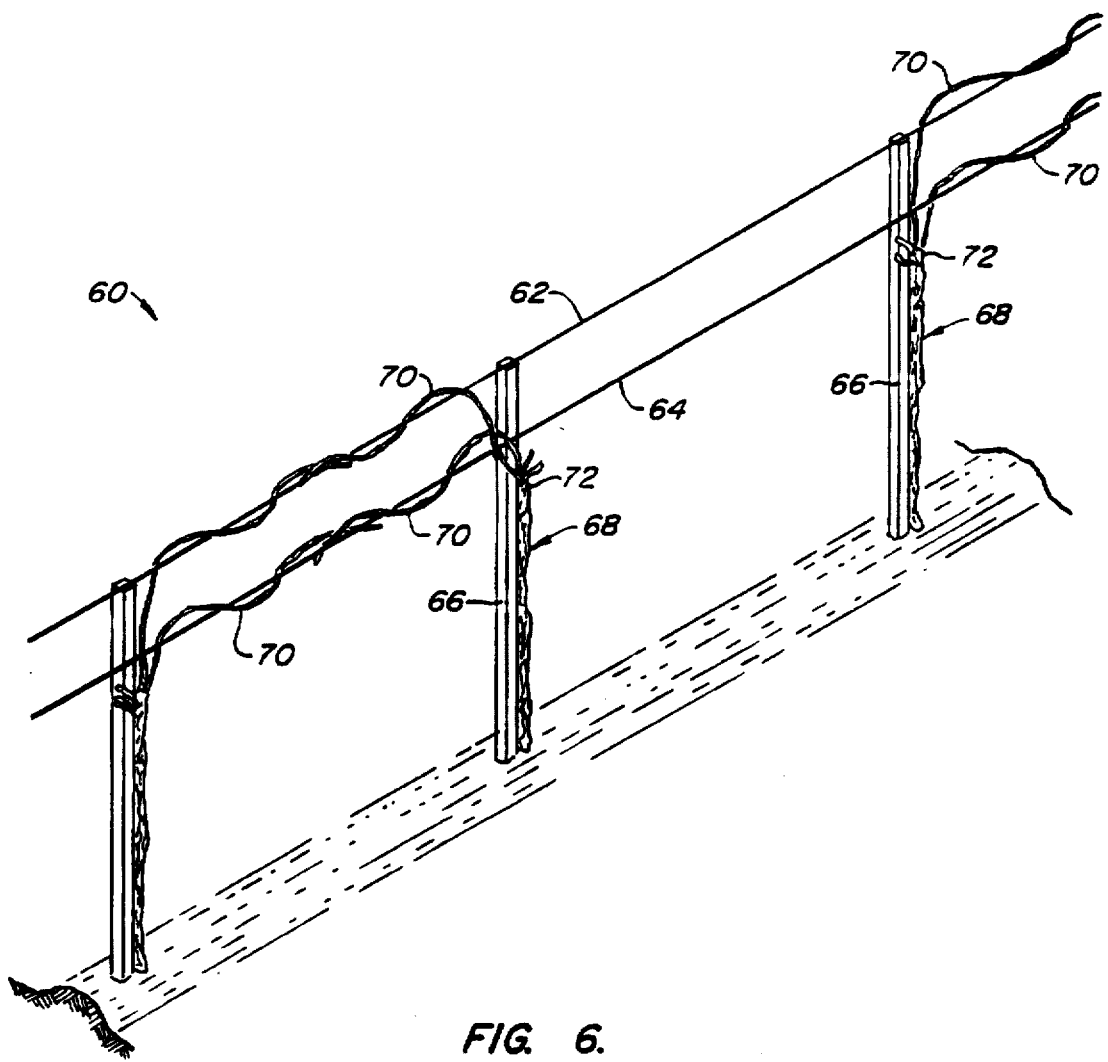
FIG. 6 illustrates a further alternative trellising arrangement.

FIG. 6 illustrates a further trellising system 60 including upper and lower vines 62, 64 supported by posts 66. Posts 66 are positioned adjacent grape vines 68. FIG. 6 shows vines 68 after winter pruning leaving only fruiting canes 70 (which were the prior year's replacement canes) guided along wires 62, 64. The new year's replacement canes will sprout from crowns 72 and be guided in the opposite direction as fruiting canes 70.

Other modifications and variations can be made through disclosed embodiments without departing from the subject of the invention as defined in the following claims. For example, grape varieties other than Thompson seedless and Fiesta can be used so long as their raisin-making characteristics do not differ substantially from Thompson seedless.

What is claimed is:

1. A method for producing raisins comprising the following steps:

selecting a grape variety from a group consisting of Thompson seedless types, said grape variety ripening at substantially the same time as Thompson seedless;

selecting a vineyard site having the following climatological characteristics:

a growing and drying season of at least 210 days long, 4000 to 5100 degree days during the growing and drying season and at least 180 sunny days during the growing and drying season;

growing the selected grape variety in rows of grape vines at the vineyard site, the growing step including the steps of:

a) creating divided canopies along rows of the grapevines with fruiting canes primarily on a side of each said row and replacement canes separated from the fruiting canes using a catching trellis system;

b) determining when the grapes have reached a desired degree of maturity; and c) cutting at least a portion of the fruiting canes between the crowns of the grapevines and the first bunch of grapes on each of the cut fruiting canes after the grapes have reached said desired level of maturity;

permitting the grapes on the cut fruiting canes to dry on the cut fruiting canes due to the heat of the sun only to create natural raisins; and harvesting the natural raisins.

2. The method of claim 1 wherein the grape variety selecting step is carried out by selecting the Thompson seedless grape variety.

3. The method of claim 1 wherein the vineyard site selecting step is carried out by limiting the site to sites within the Central Valley of California.

4. The method of claim 1 wherein the creating step of dividing the canopies is carried out by situating the replacement canes partially directly above the fruiting canes.

5. The method of claim 1 wherein the cutting step includes the step of limiting the percent of canes cut to no more than about 50% of the total canes for each grape vine.

6. The method of claim 1 wherein the selecting step is carried out by selecting a vineyard site having the following additional climatological characteristic:

a yearly annual rainfall of between about 10 to 12 inches.

7. The method of claim 6 wherein the selecting step is carried out by selecting a vineyard site having the following additional climatological characteristic:

no more than about a 20% chance of rain during the last 60 days of the growing and drying season.

* * * * *